United States Patent
Ohmori et al.

(10) Patent No.: US 9,365,215 B2
(45) Date of Patent: Jun. 14, 2016

(54) VEHICLE TRAVEL ASSIST APPARATUS

(71) Applicant: ADVICS CO., LTD., Kariya (JP)

(72) Inventors: Yosuke Ohmori, Chiryu (JP); Masaki Shiota, Anjyo (JP); Masayoshi Takeda, Kariya (JP); Yukio Mori, Nagoya (JP)

(73) Assignee: ADVICS CO., LTD., Kariya, Aichi-Pref. (JP)

(*) Notice: Subject to any disclaimer, the term of this patent is extended or adjusted under 35 U.S.C. 154(b) by 0 days.

(21) Appl. No.: 14/405,652

(22) PCT Filed: Jun. 13, 2013

(86) PCT No.: PCT/JP2013/066354
§ 371 (c)(1),
(2) Date: Dec. 4, 2014

(87) PCT Pub. No.: WO2013/187478
PCT Pub. Date: Dec. 19, 2013

(65) Prior Publication Data
US 2015/0314784 A1    Nov. 5, 2015

(30) Foreign Application Priority Data

Jun. 13, 2012   (JP) ................. 2012-133974

(51) Int. Cl.
*G06F 7/70*    (2006.01)
*G01S 13/00*   (2006.01)
(Continued)

(52) U.S. Cl.
CPC *B60W 30/14* (2013.01); *B60T 7/22* (2013.01); *B60W 30/09* (2013.01); *B60W 30/16* (2013.01); *G08G 1/16* (2013.01); *B60T 2201/022* (2013.01); *B60W 2520/00* (2013.01)

(58) Field of Classification Search
USPC ............................................. 701/70; 342/70
See application file for complete search history.

(56) References Cited

U.S. PATENT DOCUMENTS 5,805,103 A * 9/1998 Doi .................... B60K 31/0008
                                                    340/435
7,035,735 B2 * 4/2006 Knoop .................... B60T 7/22
                                                    180/169

(Continued)

FOREIGN PATENT DOCUMENTS

EP    1721800 A2   11/2006
EP    2036791 A1    3/2009

(Continued)

OTHER PUBLICATIONS

English language translation of International Preliminary Report on Patentability and the Written Opinion of the International Searching Authority (Forms PCT/IB373 and PCT/ISA1237) issued on Dec. 16, 2014, by the International Bureau of WIPO, in corresponding International Application No. PCT/JP2013/066354. (6 pages).

(Continued)

*Primary Examiner* — Thomas G Black
*Assistant Examiner* — Tyler Paige
(74) *Attorney, Agent, or Firm* — Buchanan Ingersoll & Rooney PC

(57) ABSTRACT

A collision avoidance ECU sets a model deceleration change amount to smaller value in a state in which it is difficult to reduce the speed of a host vehicle than in a state in which it is easy to reduce the speed of the host vehicle. The collision avoidance ECU calculates a first target value by multiplying the model deceleration change amount by the elapsed time. The collision avoidance ECU obtains a subtraction value by subtracting the current reference relative deceleration from the first target value. Then, the collision avoidance ECU determines a target relative deceleration to be a greater value when the subtraction value is large than when the subtraction value is small, and carries out brake control so that the reference relative deceleration approaches the target relative deceleration.

6 Claims, 5 Drawing Sheets

(51) Int. Cl.
*B60W 30/14* (2006.01)
*B60T 7/22* (2006.01)
*B60W 30/09* (2012.01)
*B60W 30/16* (2012.01)
*G08G 1/16* (2006.01)

(56) References Cited

U.S. PATENT DOCUMENTS

| | | |
|---|---|---|
| 2002/0026276 A1 | 2/2002 | Hattori et al. |
| 2004/0167702 A1 | 8/2004 | Isogai et al. |
| 2005/0171676 A1 | 8/2005 | Seki |
| 2007/0191997 A1* | 8/2007 | Isaji .......... B60T 7/22 701/1 |
| 2010/0191400 A1* | 7/2010 | Ajiro .......... B60T 1/10 701/22 |
| 2010/0280726 A1* | 11/2010 | Stabrey .......... B60T 7/22 701/701 |
| 2011/0196591 A1* | 8/2011 | Kuze .......... B60W 30/16 701/96 |
| 2012/0072243 A1* | 3/2012 | Collins .......... G06Q 40/08 705/4 |

FOREIGN PATENT DOCUMENTS

| | | |
|---|---|---|
| JP | 11-020496 A | 1/1999 |
| JP | 2000-177428 A | 6/2000 |
| JP | 2004-136836 A | 5/2004 |
| JP | 2007-062406 A | 3/2007 |
| JP | 2008-030539 A | 2/2008 |

OTHER PUBLICATIONS

International Search Report (PCT/ISA/210) mailed on Jul. 16, 2013, by the Japanese Patent Office as the International Searching Authority for International Application No. PCT/JP2013/066354.
Communication and Supplemental European Search Report dated Jan. 27, 2016 issued in the corresponding European Patent Application No. 13804723.8 (7 pages).

* cited by examiner

VEHICLE TRAVEL ASSIST APPARATUS

FIELD OF THE INVENTION

The present invention relates to a vehicle travel assist apparatus.

BACKGROUND OF THE INVENTION

In recent years, a travel assist apparatus which controls travel of a vehicle according to a set target has been under development. As one example of such a travel assist apparatus, there is known an apparatus that performs vehicle control such that the distance between two vehicles, that is, a host vehicle and a preceding vehicle present ahead of the host vehicle in the traveling direction of the host vehicle, is kept at a predetermined distance or more (refer to Patent Document 1, for example).

In the above-described apparatus, the distance between the host vehicle and the preceding vehicle is monitored. Then, when the distance between the two vehicles is less than a predetermined distance, a difference is calculated by subtracting the distance between the two vehicles from the predetermined distance, thereby controlling the vehicle speed (more specifically, a relative speed of the host vehicle with reference to the preceding vehicle) such that the difference becomes less than 0 (zero). For example, a target relative deceleration is set to be a greater value when the above-described difference is great than when the difference is small. Speed-reduction control is performed such that a relative deceleration of the host vehicle with reference to the preceding vehicle is brought close to the target relative deceleration.

Further, known types of travel assist apparatuses include an apparatus that calculates a difference by subtracting a relative deceleration at that time point from the current target relative deceleration at a predetermined interval. The greater the difference, the greater the target relative deceleration at the next time becomes.

PRIOR ART DOCUMENTS

Patent Documents

Patent Document 1: Japanese Laid-Open Patent Publication No. 2000-177428

SUMMARY OF THE INVENTION

Incidentally, speed reduction characteristics of a vehicle may change from time to time. For example, it is more difficult to reduce the speed of a vehicle on application of the brake when the vehicle travels with a great value of the carried load than when it travels in with a small value of the carried load. Although speed-reduction control is started in a state in which it is difficult to reduce the speed of the vehicle, it is difficult to increase the deceleration of the vehicle immediately after the start of the speed reduction. Thus, it is difficult to increase the relative deceleration of the vehicle and a difference (difference=target relative deceleration−relative deceleration at that time point) is easily increased. Therefore, when a control gain (a proportional gain or an integration gain) used in feedback control is set to be a great value, a target relative deceleration at the next time becomes an extremely great value. Also, there is a fear that the brake actuator may require a great value in excess of its performance limit.

A method for avoiding the above-described problem may include a method for setting a control gain to be a small value. However, in this method, when speed-reduction control is performed in a state in which a vehicle is easily reduced in speed, the difference is not increased significantly. Thus, there is a fear that the brake actuator may require a value far below the performance limit. In this case, immediately after the start of speed-reduction control, despite a desire of smoothly increasing the deceleration of the host vehicle, the relative deceleration changes at a slow gradient. As a result, there is a fear that the host vehicle may travel in a long distance from the time point at which the speed-reduction control has been started to the time point at which the relative speed reaches 0 (zero). Therefore, in order to avoid collision between the host vehicle and the preceding vehicle, the predetermined distance for determining the timing for starting the speed-reduction control is set to be a great value.

An objective of the present invention is to provide a vehicle travel assist apparatus that is capable of performing speed-reduction control appropriately, while suppressing an excessive load to a brake actuator activated on performance of the speed-reduction control.

Means for achieving the above objectives and advantages thereof will now be discussed.

In accordance with one aspect of the present invention, a vehicle travel assist apparatus is provided that performs speed-reduction control in which a relative deceleration (Gr) of a host vehicle (C1) with respect to an object (C2) present ahead of the host vehicle (C1) in a traveling direction approaches a target relative deceleration (Af), and a relative speed (Vr) of the host vehicle (C1) with reference to the object (C2) becomes less than or equal to a specified speed (Vth) at a target position (P1) set behind the object (C2). A model deceleration change amount (Jmin) is set to be a smaller value in a state in which it is relatively more difficult to reduce the speed of the vehicle than in a state in which it is relatively easy to reduce the speed of the vehicle (S17). A subtraction value is obtained by subtracting the current relative deceleration (Gr) from a target value (AfR1), which corresponds to a result obtained by multiplying the model deceleration change amount (Jmin) by an elapsed time (ΔTst) from a set time point of the model deceleration change amount (Jmin). The target relative deceleration (Af) is determined to be a greater value when the subtraction value is great than when the subtraction value is small (S25).

Speed reduction characteristics of a vehicle change from time to time. Therefore, according to the above-described configuration, on performing the speed-reduction control, the model deceleration change amount (Jmin) is set based on the speed reduction characteristics of the vehicle at the time. As a result, the subtraction value obtained by subtracting the current relative deceleration (Gr) from the target value (AfR1), which is obtained by multiplying the model deceleration change amount (Jmin) by the elapsed time (ΔTst), is less likely to be influenced by the speed reduction characteristics of the vehicle at the time. Therefore, in a state in which it is difficult to reduce the speed of the vehicle, the target relative deceleration (Af) is not easily increased to be an extremely great value. That is, even if the control gain used in the speed-reduction control is set to be a great value, it is less likely to make such a request for greatly changing the deceleration in excess of the speed reduction characteristics of the vehicle at that time. Therefore, it is possible to suppress an excessive load to the brake actuator activated on performance of the speed-reduction control and also perform the speed-reduction control appropriately.

In the vehicle travel assist apparatus, the target value that corresponds to the result obtained by multiplying the model deceleration change amount (Jmin) by the elapsed time (ΔTst) is preferably set as a first target value (AfR1) (S19). Based on the current relative speed (Vr) and a distance (Xr) between a current position of the vehicle and the target position (P1), a target relative deceleration with which the relative speed (Vr) becomes equal to or less than the specified speed (Vth) at the target position (P1) is preferably calculated as a second target value (AfR2) (S20). A subtraction value is preferably obtained by subtracting the current relative deceleration (Gr) from a smaller target value (AfR) of the first and the second target values (AfR1, AfR2), and the target relative deceleration (Af) is preferably determined to be a greater value when the subtraction value is great than when the subtraction value is small (S21, S25).

The first target value (AfR1) increases as the elapsed time (ΔTst) increases. Therefore, in the course of increasing the relative deceleration (Gr), it is preferable that the target relative deceleration (Af) be determined based on the first target value (AfR1). However, when the relative deceleration (Gr) increases to some extent and thereafter, the target relative deceleration (Af) is slightly adjusted, it becomes possible to decrease the interval between the position at which the relative speed (Vr) becomes equal to or less than the specified speed (Vth) and the target position (P1). It is, therefore, preferable that the target relative deceleration (Af) be determined not based on the first target value (AfR1) which increases in proportion to the elapsed time (ΔTst), but based on the second target value (AfR2).

In this respect, adoption of the above-described control configuration allows the first target value (AfR1) to become easily smaller than the second target value (AfR2) after the start of speed-reduction control and, therefore, the target relative deceleration (Af) is determined based on the first target value (AfR1). Then, the second target value (AfR2) becomes smaller than the first target value (AfR1) with some increase in relative deceleration (Gr), so that the target relative deceleration (Af) is determined based on the second target value (AfR2). As a result, the target relative deceleration (Af) is suppressed from being determined to be an extremely great value. Therefore, the target relative deceleration (Af) can be determined to be an appropriate value according to deceleration of the vehicle at each time point, thus making it possible to decrease the above-described interval.

The reference relative deceleration (Asub), which is a relative value based on a relative deceleration at the time of meeting a starting condition of speed-reduction control, is less likely to be great when it is difficult to reduce the speed of the vehicle than when it is easy to reduce the speed of the vehicle. Therefore, the deceleration change amount (Jt), which is an amount of change of the reference relative deceleration at the time point at which the reference relative deceleration (Asub) reaches the specified relative deceleration (Ath), is smaller when it is difficult to reduce the speed of the vehicle than when it is easy to reduce the speed of the vehicle.

Thus, when the reference relative deceleration (Asub), reaches a specified relative deceleration (Ath) (S14:YES), the model deceleration change amount (Jmin) is preferably set to be a smaller value when a deceleration change amount (Jt), which is an amount of change of a reference relative deceleration at the time point, is small than when the deceleration change amount (Jt) is great (S17). According to the configuration, it is possible to set the model deceleration change amount (Jmin) to an appropriate value according to the speed reduction characteristics of the vehicle at that time. As a result, the target relative deceleration (Af) can be determined to be an appropriate value according to the speed reduction characteristics of the vehicle at the time, thus making it possible to perform the speed-reduction control appropriately.

When the reference relative deceleration (Asub) is less than the specified relative deceleration (Ath) (S14: NO), the target relative deceleration (Af) is preferably kept at a target relative deceleration reference value (Afn) (S15). In a case in which the reference relative deceleration (Asub) becomes equal to or more than the specified relative deceleration (Ath) (S14:YES), the target relative deceleration (Af) is preferably determined to be a greater value when a subtraction value obtained by subtracting the current relative deceleration (Gr) from a smaller target value (AfR) of the first and the second target values (AfR1, AfR2) is great than when the subtraction value is small (S21, S25).

Adoption of the above-described control configuration makes it possible to perform feed-forward control that brings the reference relative deceleration (Asub) close to the target relative deceleration reference value (Afn) when the reference relative deceleration (Asub) is less than the specified relative deceleration (Ath), in other words, when the model deceleration change amount (Jmin) is not yet set. When the reference relative deceleration (Asub) reaches the specified relative deceleration (Ath) under the above-described control, the model deceleration change amount (Jmin) is set based on the deceleration change amount (Jt) at that time point. As described so far, before the model deceleration change amount (Jmin) is set, the target relative deceleration (Af) is a constant value. Thus, even before the model deceleration change amount (Jmin) is set, the model deceleration change amount (Jmin) can be set to be a value according to the speed reduction characteristics of the vehicle at the time more easily than a case where the target relative deceleration (Af) is changeable. As a result, it is possible to perform the speed-reduction control appropriately according to the speed reduction characteristics of the vehicle at the time.

In the above described vehicle travel assist apparatus, when the reference relative deceleration (Asub) becomes equal to or more than the specified relative deceleration (Ath) (S14: YES), the following operations are preferably performed. That is, on the assumption that the deceleration (Gc) of the vehicle is maintained at the smaller target value (AfR) of the first and the second target values (AfR1, AfR2), an estimated value of the distance traveled by the vehicle from the present time to a time point at which the relative speed (Vr) becomes equal to or less than the specified speed (Vth) is calculated as a target distance (Xth) (S22). Also, on the assumption that the deceleration (Gc) of the vehicle is maintained at a current deceleration of the vehicle, an estimated value of the distance traveled by the vehicle from the present time to a time point at which the relative speed (Vr) becomes equal to or less than the specified speed (Vth) is calculated as a speed reduction distance, and the target relative deceleration (Af) is set to be a greater value when a subtraction value obtained by subtracting the target distance (Xth) from the speed reduction distance is great than when the subtraction value is small (S24, S25).

According to the above-described configuration, the target relative deceleration (Af) is set to be a value greater than the target relative deceleration reference value (Afn) when the speed reduction distance is greater than the target distance (Xth) and also set to be a value smaller than the target relative deceleration reference value (Afn) when the speed reduction distance is smaller than the target distance (Xth). As described above, the target relative deceleration (Af) is determined with the distance taken into account. This makes it possible to decrease as much as possible the interval between the position at which the relative speed (Vr) becomes equal to or less than the specified speed (Vth) and the target position (P1).

In the above described vehicle travel assist apparatus, when the reference relative deceleration (Asub) is less than the specified relative deceleration (Ath) (S14: NO), the target relative deceleration (Af) is preferably kept at the target relative deceleration reference value (Afn) (S15). Thereafter, when the reference relative deceleration (Asub) becomes equal to or more than the specified relative deceleration (Ath) (S14: YES), the following operations are preferably performed. That is, on the assumption that the deceleration (Gc) of the vehicle is maintained at the smaller target value (AfR) of the first and the second target values (AfR1, AfR2), an estimated value of the distance traveled by the vehicle from the present time to a time point at which the relative speed (Vr) becomes equal to or less than the specified speed (Vth) as the target distance (Xth) (S22). Also, the target relative deceleration (Af) is set to be a greater value when a subtraction value obtained by subtracting the distance (Xr) between the current position of the vehicle and the target position (P1) from the target distance (Xth) is great than when the subtraction value is small.

According to the above-described configuration, the target relative deceleration (Af) is set such that the difference between the target distance (Xth) and the distance (Xr) from the current position of the vehicle to the target position (P1) approaches 0 (zero). As described above, the target relative deceleration (Af) is determined with the distance taken into account. This makes it possible to decrease as much as possible the interval between the position at which the relative speed (Vr) becomes equal to or less than the specified speed (Vth) and the target position (P1).

In order to provide a better understanding of the present invention, a description has been given of the embodiment by using corresponding reference numerals. As a matter of course, the present invention is not limited to the embodiment.

THE PREFERRED EMBODIMENTS

One embodiment of the present invention will now be described with reference to FIGS. 1 to 5.

Figure 1:
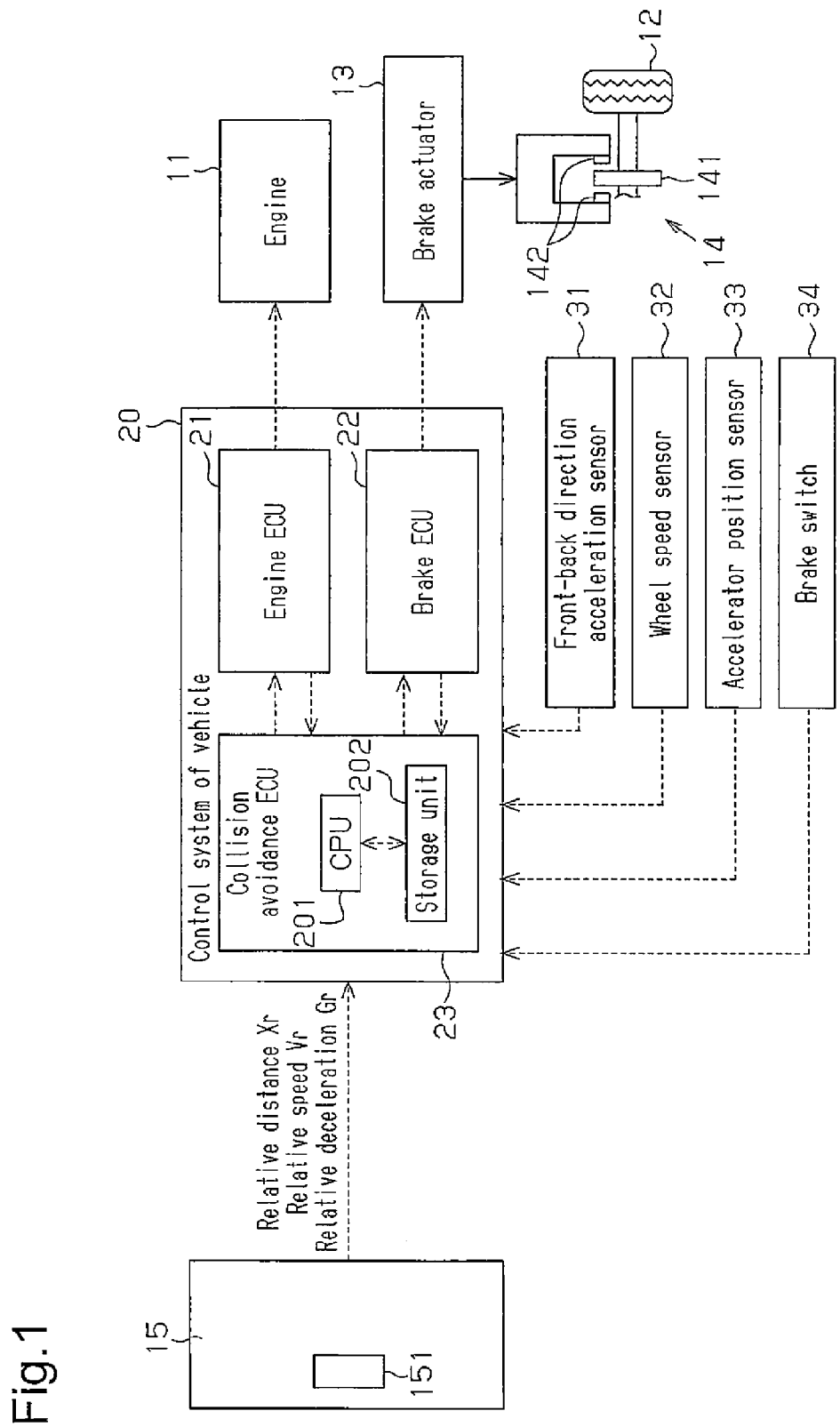
FIG. 1 is a block diagram showing a vehicle having a collision avoidance ECU that is one embodiment of a vehicle travel assist apparatus of the present invention.

As shown in FIG. 1, the vehicle is provided with an engine 11, which outputs power depending on accelerator operation by the driver, a brake actuator 13, which actuates to impart brake torque to wheels 12, and a friction-type brake mechanism 14, which is installed for each of the wheels 12. The brake mechanism 14 is provided with a rotating body 141 (such as a rotor), which rotates integrally with the wheel 12 and a friction material 142 (such as a pad), which is positioned at a position away from the rotating body 141 when the brake mechanism is not in operation. In the above-described brake mechanism 14, when the driver operates the brake or actuates the brake actuator 13, the friction material 142 is brought close to the rotating body 141. When the friction material 142 slidably contacts the rotating body 141, a brake torque depending on a frictional force between the friction material 142 and the rotating body 141 is imparted to the wheel 12.

Further, the vehicle is provided with a collision-avoidance-object recognizing system 15, which recognizes a collision avoidance object that is present ahead of the vehicle in a traveling direction. In the present embodiment, the collision avoidance object includes a preceding vehicle that runs ahead of the host vehicle in the traveling direction, a non-movable object such as a wall installed ahead of the host vehicle in the traveling direction, and objects (for example, a vehicle or a pedestrian) that has suddenly entered the traveling route of the vehicle.

The collision-avoidance-object recognizing system 15 includes a radar system, which uses radar and millimeter waves and a stereo-image processing system. The above-described collision-avoidance-object recognizing system 15 is provided with a monitoring unit 151 such as a camera, a radar, and a sensor, which are installed at a position at which it is possible to monitor the view ahead of the host vehicle in the traveling direction.

Upon recognition of a collision avoidance object by the monitoring unit 151, the collision-avoidance-object recognizing system 15 measures a relative distance Xr between the host vehicle and the collision avoidance object, a relative speed Vr of the vehicle with reference to the collision avoidance object, and a relative deceleration Gr of the host vehicle with reference to the collision avoidance object at a predetermined interval set in advance based on monitoring results by the monitoring unit 151. Then, each time the relative distance Xr, the relative speed Vr and the relative deceleration Gr are measured, the collision-avoidance-object recognizing system 15 transmits relative information on the relative distance Xr, the relative speed Vr and the relative deceleration Gr to a control system 20 of the vehicle. The relative speed Vr is a value corresponding to a value obtained by subjecting the relative distance Xr to time differentiation. Further, the relative deceleration Gr is a value corresponding to a value obtained by subjecting the relative speed Vr to time differentiation.

The control system 20 receives the relative information at a predetermined interval from the collision-avoidance-object recognizing system 15. The above-described control system 20 is electrically connected with a front-back direction acceleration sensor 31, which detects a front-back direction deceleration (hereinafter, simply referred to as deceleration) of the host vehicle and a wheel speed sensor 32, which detects a wheel speed of the wheel 12. Further, the control system 20 is electrically connected with an accelerator position sensor 33, which detects an amount of accelerator operation by a driver and a brake switch 34, which detects whether the driver operates the brake.

The control system 20 is provided with a plurality of electronic control units (ECUs), each of which has a CPU 201 and a storage unit 202 composed of a ROM, a RAM, a non-volatile memory and the like. The above-described ECUs include an engine ECU 21, a brake ECU 22, and a collision avoidance ECU 23 as an example of the travel assist apparatus.

The engine ECU 21 manages various controls of the engine 11 such as fuel injection control and adjustment/control of an intake amount. The engine ECU 21 calculates an accelerator position based on a signal detected by the accelerator position sensor 33 and transmits information on the accelerator position to other ECUs.

The brake ECU 22 manages adjustment/control of a brake torque applied to the host vehicle and adjustment/control of a brake torque for each of the wheels 12. The brake ECU 22 calculates the speed of the host vehicle based on a signal detected by at least one of the wheel speed sensors 32 of the respective wheel speed sensors 32 installed on the respective wheels 12, and the deceleration of the host vehicle based on a signal detected by the front-back direction acceleration sensor 31. Then, the brake ECU 22 transmits to the other ECUs information on whether the brake is operated in addition to information on the thus calculated vehicle speed and deceleration. The thus calculated deceleration is a positive value when the host vehicle is reduced in speed, while the deceleration is a negative value when the vehicle is increased in speed.

Travel information on the accelerator position, the vehicle speed, and the deceleration is calculated at an interval that is shorter than a predetermined interval at which the relative distance Xr, the relative speed Vr, and the relative deceleration Gr are measured by the collision-avoidance-object recognizing system 15.

Next, a description will be given of one example of a method for avoiding collision between a host vehicle and a collision avoidance object with reference to FIG. 2. The collision avoidance object is assumed to be a preceding vehicle C2, which runs ahead of a host vehicle C1 in the traveling direction and a relative distance Xr between the host vehicle C1 and the preceding vehicle C2 is assumed to become shorter due to sudden stop of the preceding vehicle C2.

Figure 2A:
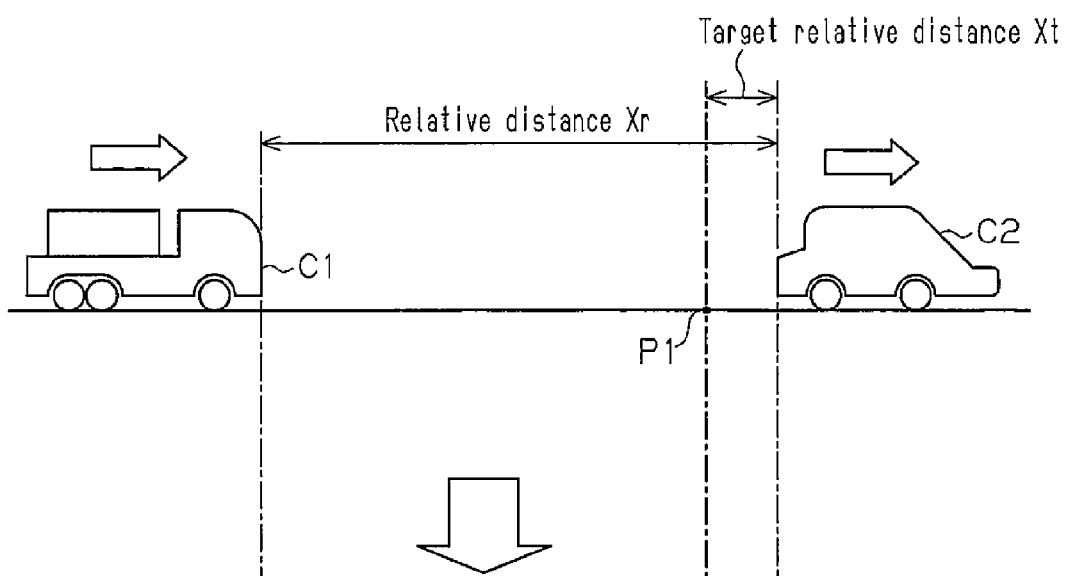
FIGS. 2A and 2B are diagrams showing avoidance of collision between a host vehicle and a preceding vehicle by performing brake control.

As shown in FIG. 2A, when the host vehicle C1 and the preceding vehicle C2 run at the same vehicle speed VS, in other words, when the relative speed Vr of the host vehicle C1 with reference to the preceding vehicle C2 is 0 (zero), there is no change in the relative distance Xr. However, when the host vehicle C1 runs at a constant speed and the preceding vehicle C2 is reduced in speed to stop, the relative speed Vr of the host vehicle C1 with reference to the preceding vehicle C2 is greater than 0 (zero). As a result, the relative distance Xr quickly becomes short.

Figure 2B:
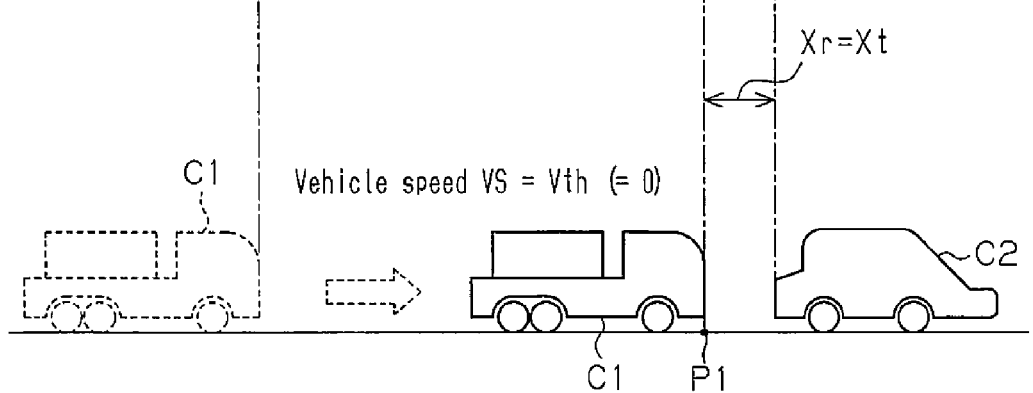

Then, when the collision avoidance ECU 23 of the host vehicle C1 determines that there is a high probability of collision between the host vehicle C1 and the preceding vehicle C2, the host vehicle C1 starts to perform brake control as one example of speed-reduction control. For example, as shown in FIG. 2B, a target position P1 is set to be behind only by a target relative distance Xt (for example, 1 meter) from the preceding vehicle C2, and a target relative deceleration is set such that the relative speed Vr becomes a specified speed Vth (0 (zero) in the present embodiment) around the target position P1. That is, the brake control is performed such that the vehicle speed VS of the host vehicle C1 is 0 (zero) at the thus set target position P1.

A description will be given of one example of a method for determining the target relative deceleration by referring to the timing chart of FIG. 3.

Figure 3A:
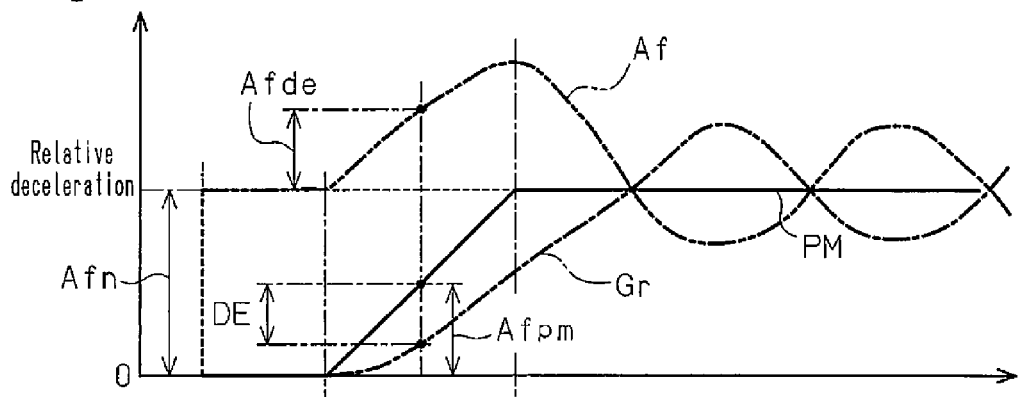
FIGS. 3A to 3C are timing charts showing changes in relative deceleration, relative speed, and relative distance on performance of brake control in a comparative example.

As shown in FIG. 3A, even if the starting condition of brake control is at the first time point t11 to start the brake control, the host vehicle C1 begins to increase in deceleration from the second time point t12, which is after the first time point t11. This is due to the fact that a time lag takes place with a delay in response of the brake actuator 13 at the start of imparting the actual brake torque to the wheel 12. In addition, the period from the above-described first time point t11 to the second time point t12 is also referred to as a free running period.

Thus, in the method of the comparative example that is explained by referring to FIG. 3, a model profile PM shown by the solid line in FIG. 3A is made ready in advance. That is, in the model profile PM, during the free running period, deceleration becomes constant at 0 (zero). At the second time point t12 and thereafter, the deceleration is increased at a constant gradient. At the third time point t13 and thereafter, the deceleration becomes constant at a final target value. In addition, the free running period and the constant gradient are set in advance based on design characteristics of the vehicle.

In the above-described method of the comparative example, a target relative deceleration reference value Afn is set based on the model profile PM as well as the relative speed Vr and the relative deceleration Gr at the time of meeting the starting condition. The greater the relative speed Vr, the greater the target relative deceleration reference value Afn is set to be.

When the target relative deceleration reference value Afn is set at the first time point t11, as shown by the long dashed double-short dashed line in FIG. 3A, the target relative deceleration Af is set as a target relative deceleration reference value Afn, and brake control is performed. Up to the second time point t12, which is assumed to be the free running period based on the model profile PM, the target relative deceleration Af is retained at the target relative deceleration reference value Afn. That is, the method of the comparative example is such that feed forward control is performed from the first time point t11 to the second time point t12.

Then, after elapse of the second time point t12, a difference DE (DE=Afpm−Gr) between a profile target value Afpm along the model profile PM and a relative deceleration Gr at that time point is calculated at predetermined calculation intervals by the collision avoidance ECU 23. A speed reduction starting time point, at which the host vehicle C1 actually begins to increase in deceleration, is not necessarily a time point (second time point t12) on the model profile PM. That is, the speed reduction starting time point is delayed when it is difficult to reduce the speed of the host vehicle C1 than when it is easy to reduce the speed.

Then, after calculation of the difference DE, a feedback target value Afde is calculated with which the difference DE reaches 0 (zero). On calculation of the feedback target value Afde, adopted is publicly known PID control (feedback control). Therefore, the feedback target value Afde becomes greater as the difference DE increases. Then, the target relative deceleration Af is obtained by adding the feedback target value Afde to the target relative deceleration reference value Afn. In addition, at the second time point t12 and thereafter, the difference DE is sequentially calculated, so that the target relative deceleration Af is changed each time the difference DE is changed.

That is, as shown in FIG. 3A, when the difference DE is gradually increased as seen from the second time point t12 to the third time point t13, the target relative deceleration Af is gradually increased with the lapse of time. On the other hand, when the difference DE is gradually decreased as seen at the third time point t13 and thereafter, the target relative deceleration Af is gradually decreased with the lapse of time. Then, at the third time point t13, at which the profile target value Afpm becomes constant along the model profile PM becomes constant, and thereafter, the relative deceleration Gr reaches the vicinity of the target relative deceleration reference value Afn.

The speed reduction characteristics of the host vehicle C1 change from time to time. For example, it is more difficult to reduce the speed of the host vehicle C1 when the host vehicle C1 travels with a great value of the carried load than when the host vehicle C1 travels with a low value of the carried load. Further, whether or not the host vehicle C1 can be easily reduced in speed may vary depending on the wear degree of a tire mounted to the wheel 12. Then, when the host vehicle C1 is easily reduced in speed, the above-described difference DE is hardly increased to an excessive extent. However, when it is difficult to reduce the speed of the host vehicle C1, the difference DE may be increased to an excessive extent.

Therefore, in the method of the comparative example, it is preferable that a control gain (such as a proportional gain or an integration gain) used on brake control be set as a small value. Thereby, even in a state in which it is difficult to reduce the speed of the host vehicle C1, a request made to the brake actuator 13 to give an extremely great value in excess of the performance limit thereof is suppressed. However, in this case, when the host vehicle C1 is in a state of being easily reduced in speed, there is a fear that the brake actuator 13 may be requested to give an extremely small value, thereby allowing the host vehicle C1 to change in deceleration at an unnecessarily slow gradient.

Figure 3B:
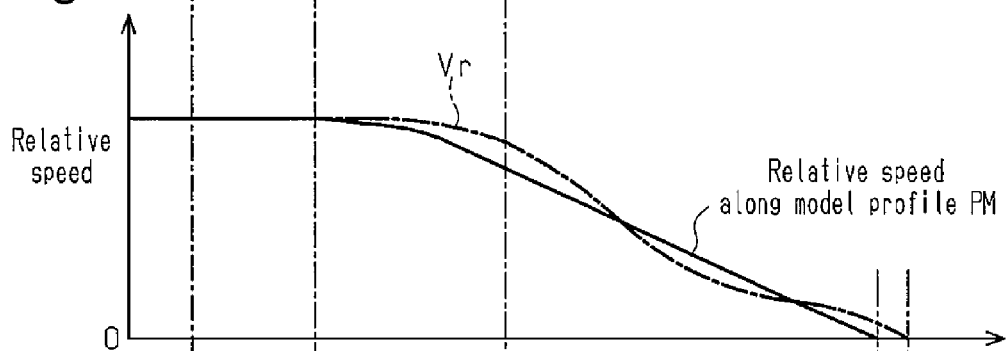

Further, as shown in FIG. 3B, when the brake control is started, the relative speed Vr is decreased in accordance with a change in relative deceleration Gr. At this time, as described above, the speed reduction starting time point is later than the time point on the model profile PM (in this case, the second time point t12). Therefore, the relative speed Vr begins to decrease with a delay from the time point at which the relative speed based on the model profile PM begins to decrease.

Further, at the third time point t13 and thereafter, the relative deceleration Gr varies in degree. Therefore, the relative speed Vr becomes faster or slower than the speed corresponding to the model profile PM. As a result, there is a fear that a fifth time point t15, at which the relative speed Vr reaches 0 (zero), may be later than the fourth time point t14 on the model profile PM.

Figure 3C:
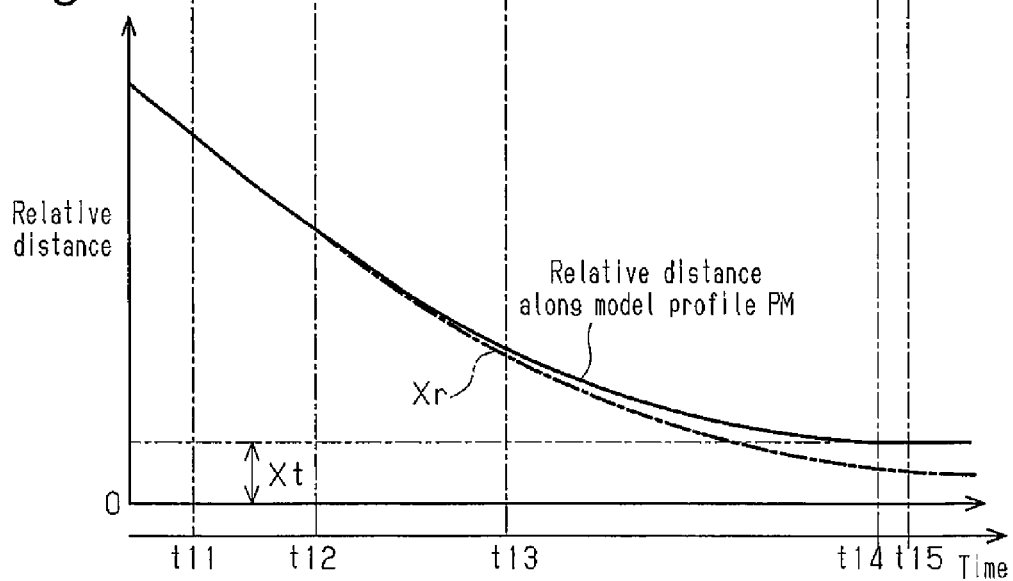

As described above, upon delay of a time point at which the relative speed Vr becomes 0 (zero), as shown in FIG. 3C, there is a fear that, despite the fact that the brake control is performed such that the relative speed Vr reaches 0 (zero) at the time point at which the relative distance Xr reaches a target relative distance Xt, a relative distance Xr at the time point at which the relative speed Vr reaches 0 (zero) may be shorter than the target relative distance Xt. Therefore, in order to avoid collision between the host vehicle C1 and a collision avoidance object by the brake control, which uses the target relative deceleration Af determined by the method of the comparative example, it is preferable that the target relative distance Xt be set to be a great value. In this case, the brake control is started earlier.

In contrast, in the present embodiment, the target relative deceleration Af is determined by a method different from the above-described method of the comparative example. Next, a description will be given of a setting method of the present embodiment with reference to FIG. 4.

Figure 4A:
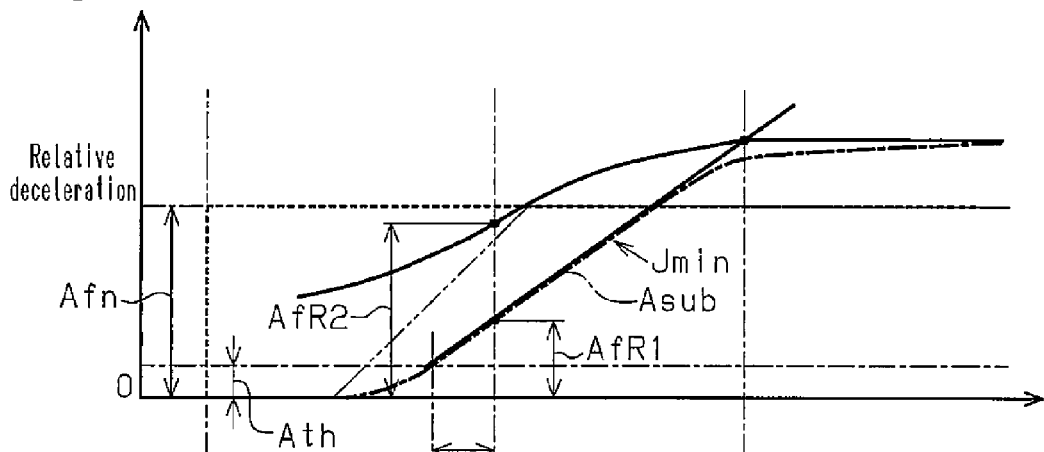
FIGS. 4A to 4C are timing charts showing changes in relative deceleration, relative speed, and relative distance on performing the brake control of the present embodiment.

As shown in FIG. 4A, immediately after the first time point t21 of meeting the starting condition of brake control, the target relative deceleration reference value Afn is calculated, as with the method of the comparative example. The target relative deceleration reference value Afn is set as a target relative deceleration Af. When the brake control is performed by using the target relative deceleration Af (Af=Afn), the reference relative deceleration Asub, which is a relative value based on the relative deceleration Gr at the time of meeting the starting condition, is calculated at predetermined calculation intervals by the collision avoidance ECU 23.

Further, when the brake control is started, the second target value AfR2 is calculated by using the relational expression 1 given below. The second target value AfR2 is a value calculated based on a relative speed Vr at that time point as well as a distance ΔX (ΔX=Xr−Xt) between a current position of the host vehicle C1 and the target position P1, that is, a target relative deceleration for making the relative speed Vr equal to or less than a specified speed Vth (in this case, 0 (zero)) at the target position P1.

$$AfR2 = \frac{(Vr - Vth)^2}{2 \times (Xr - Xt)} \quad \text{(Expression 1)}$$

Then, the reference relative deceleration Asub begins to increase by performance of the brake control. When the reference relative deceleration Asub reaches the specified relative deceleration Ath at the second time point t22, the reference relative deceleration Asub is determined to be kept substantially constant in amount of change. Then, the amount of change of the reference relative deceleration Asub at that time point is calculated as the deceleration change amount Jt. The deceleration change amount Jt is set as a smaller value when it is difficult to reduce the speed of the host vehicle C1 than when it is easy to reduce the speed.

Then, in the present embodiment, the model deceleration change amount Jmin is set based on the deceleration change amount Jt obtained at the second time point t22. For example, the model deceleration change amount Jmin is set as the deceleration change amount Jt. As described above, at the second time point t22 when the deceleration change amount Jt has been set and thereafter, the first target value AfR1 according to a result obtained by multiplying the model deceleration change amount Jmin by the elapsed time ΔTst from the second time point t22 when the model deceleration change amount Jmin has been set is calculated by using the relational expression 2 given below.

$$AfR1 = Jmin \times \Delta Tst + Ath \quad \text{(Expression 2)}$$

Upon calculation of the first target value AfR1 as described above, the first target value AfR1 is compared with the second target value AfR2. Then, the smaller one of the first and the second target values AfR1 and AfR2 is set as a corrected target relative deceleration AfR. For example, at the third time point t23, the first target value AfR1 is set as the corrected target relative deceleration AfR. Further, at the fourth time point t24 and thereafter, the second target value AfR2 is set as the corrected target relative deceleration AfR.

Then, on the assumption that the deceleration of the host vehicle C1 is a corrected target relative deceleration AfR at that time point, an estimated value of the distance that can be traveled by the host vehicle C1 from the present time to a time point at which the relative speed Vr becomes equal to or less than the specified speed Vth is calculated as the target distance Xth. For example, the target distance Xth is obtained by integrating the corrected target relative deceleration AfR twice.

Further, on the assumption that the deceleration of the host vehicle C1 at that time point is to be maintained, an estimated value of the distance that can be traveled by the host vehicle C1 from the present time to a time point at which the relative speed Vr reaches the specified speed Vth (in this case, 0 (zero)) is calculated as a speed reduction distance. Then, a distance difference (subtraction value) is calculated by subtracting the target distance Xth from the speed reduction distance. The distance difference is set as a greater value when a subtraction value obtained by subtracting the current relative deceleration Gr from the corrected target relative deceleration AfR is great than when the subtraction value is small.

Then, the shortfall in the deceleration of the vehicle required for bringing the distance difference close to 0 (zero) is derived as a distance feedback deceleration AfFB. The distance feedback deceleration AfFB is set as a positive value when the speed reduction distance is greater than the target distance Xth and set as a negative value when the speed reduction distance is smaller than the target distance Xth.

Then, a value obtained by adding the above-described target relative deceleration reference value Afn to the distance feedback deceleration AfFB is set as the target relative deceleration Af. That is, in the present embodiment, after the model deceleration change amount Jmin has been set (in particular, between the second time point t22 and the fourth time point t24), the target relative deceleration reference value Afn is corrected according to the first target value AfR1 based on the model deceleration change amount Jmin, and the corrected value is set as the target relative deceleration Af. Thus, the brake control is performed such that the relative deceleration Gr is brought close to the target relative deceleration Af. Further, at the fourth time point t24 and thereafter, the target relative deceleration reference value Afn is corrected according to the second target value AfR2 and the corrected value is set as the target relative deceleration Af.

Figure 4B:
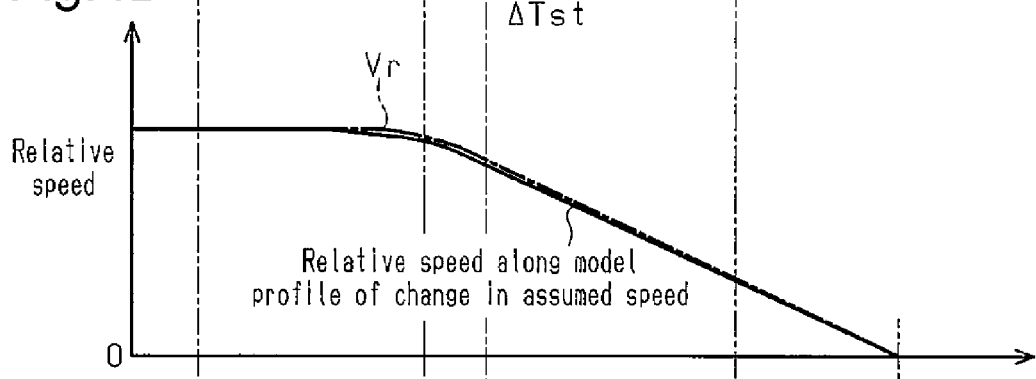
Figure 4C:
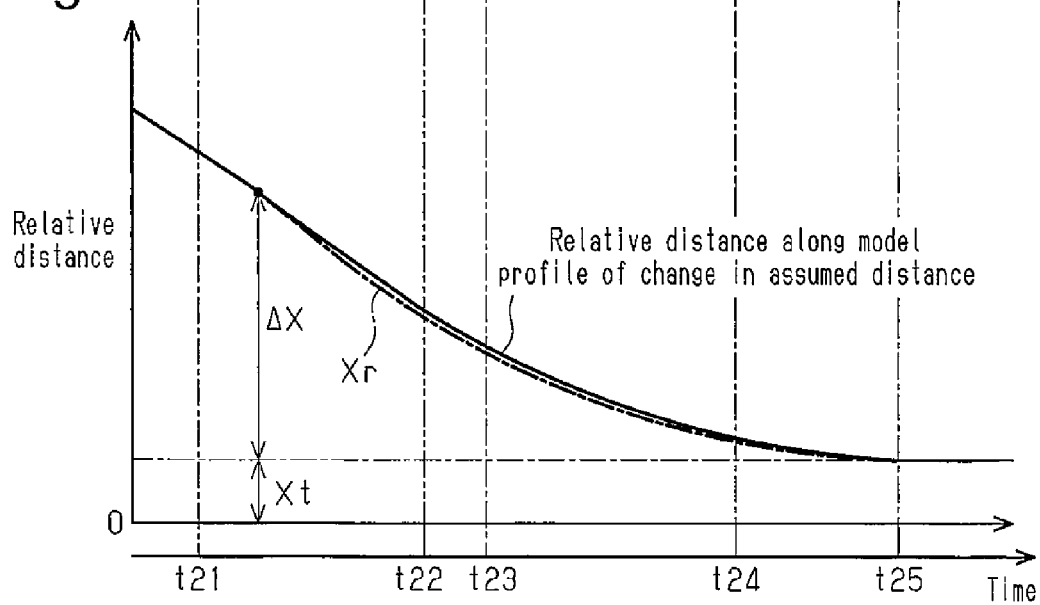

As a result, as shown in FIG. 4B, the relative speed Vr is decreased in accordance with a model profile of speed which is estimated in advance. Further, as shown in FIG. 4C, the relative distance Xr is also decreased along a model profile of change in distance that is estimated in advance. Therefore, at a fifth time point t25, which is estimated at the time point of meeting the starting condition of brake control, the relative speed Vr becomes equal to or less than a specified speed Vth at the vicinity of the target position P1.

Next, a description will be given of a process routine that is performed by the collision avoidance ECU 23 in order to avoid collision between the host vehicle C1 and a collision avoidance object with reference to the flowchart shown in FIG. 5. This process routine is performed at the predetermined calculation intervals.

Figure 5:
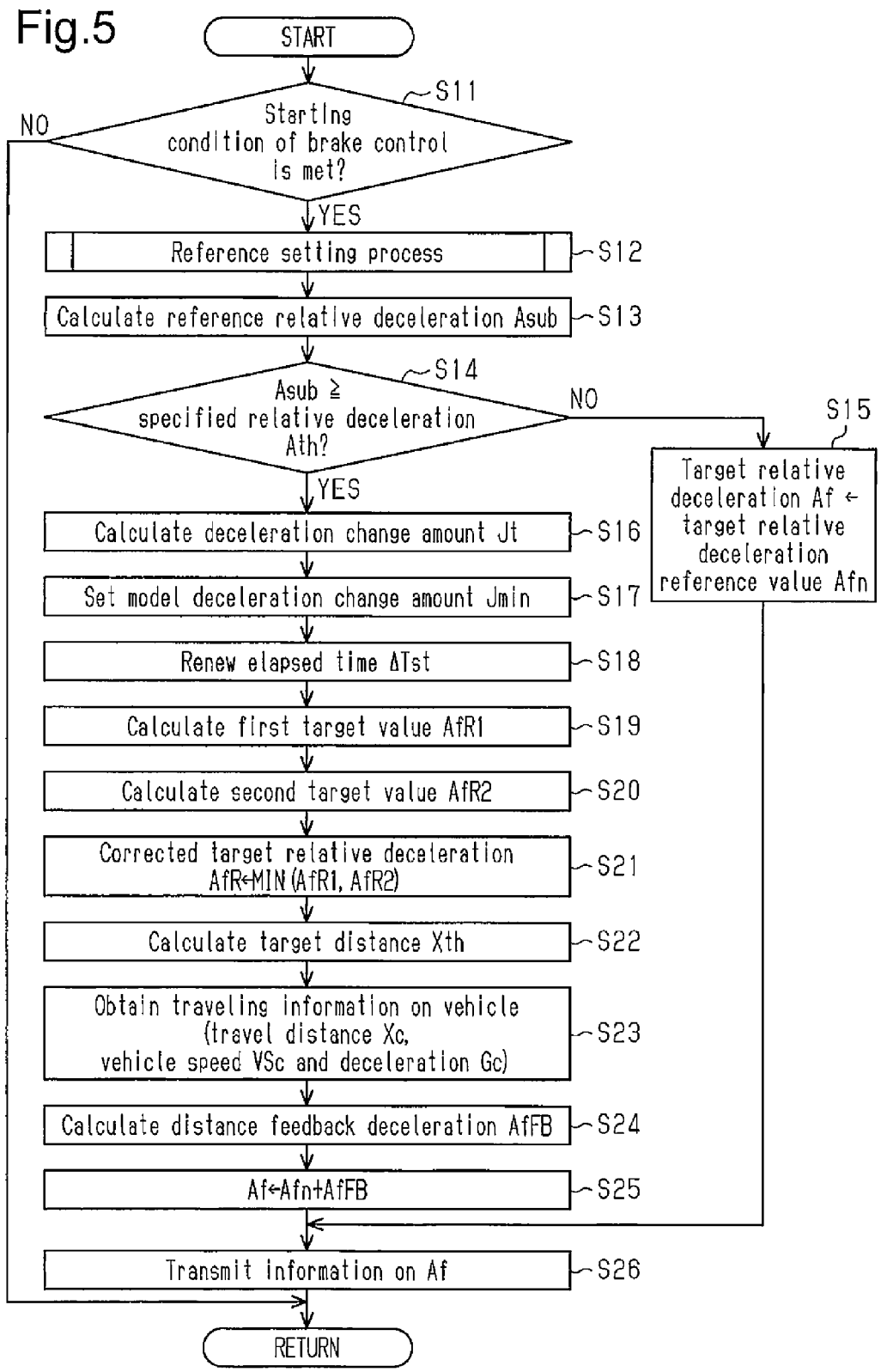
FIG. 5 is an explanatory flowchart showing a process routine performed by the collision avoidance ECU to avoid collision between the host vehicle and a collision avoidance object.

In the process routine shown in FIG. 5, the collision avoidance ECU 23 determines whether the starting condition of brake control is met (Step S11). When the starting condition is not met (Step S11: NO), the collision avoidance ECU 23 temporarily suspends the process routine. On the other hand, when the starting condition is met (Step S11: YES), the collision avoidance ECU 23 carries out a reference calculation process for calculating the target relative deceleration reference value Afn based on the relative speed Vr and the relative distance Xr at the time of meeting the starting condition (Step S12).

Then, at the collision avoidance ECU 23, a relative deceleration Gr when the starting condition has been met is subtracted from a current relative deceleration Gr to obtain a result, and the result is set as a reference relative deceleration Asub (Step S13). Next, the collision avoidance ECU 23 determines whether the reference relative deceleration Asub calculated in Step S13 is greater than or equal to a specified relative deceleration Ath which has been set in advance (Step S14). The specified relative deceleration Ath is set in advance based on the reference relative deceleration Asub at a time point at which the host vehicle C1 is estimated to change in constant deceleration gradient by performing the first brake control.

Then, when the reference relative deceleration Asub is less than the specified relative deceleration Ath (Step S14: NO), the collision avoidance ECU 23 sets the target relative deceleration reference value Afn calculated in Step S12 as the target relative deceleration Af (Step S15), and the process is shifted to Step S26 to be described later. On the other hand, when the reference relative deceleration Asub becomes equal to or more than the specified relative deceleration Ath (Step S14: YES), the collision avoidance ECU 23 calculates the deceleration change amount Jt, which is the amount of change of the relative deceleration at that time point (Step S16). Thereafter, the collision avoidance ECU 23 gives the model deceleration change amount Jmin as the deceleration change amount Jt calculated in Step S16 (Step S17) and renews the elapsed time ΔTst from a time point at which the reference relative deceleration Asub has reached the specified relative deceleration Ath (Step S18).

Then, the collision avoidance ECU 23 substitutes the model deceleration change amount Jmin and the elapsed time ΔTst set and renewed in Steps S17 and S18 into the relational expression 2, thereby calculating the first target value AfR1 (Step S19). Next, the collision avoidance ECU 23 substitutes the current relative distance Xr and the relative speed Vr into the relational expression 1, thereby calculating the second target value AfR2 (Step S20). Then, of the first and the second target values AfR1, AfR2 calculated respectively in Steps S19, S20, the collision avoidance ECU 23 sets the smaller target value thereof as the corrected target relative deceleration AfR (Step S21).

Next, the collision avoidance ECU 23 integrates twice the corrected target relative deceleration AfR obtained in Step S21, thereby calculating the target distance Xth (Step S22). Then, the collision avoidance ECU 23 obtains a traveling distance Xc, a vehicle speed VSc, and a deceleration Gc as traveling information on the host vehicle C1 (Step S23). Next, the collision avoidance ECU 23 calculates the above-described distance feedback deceleration AfFB (Step S24) and sets the result obtained by adding the distance feedback deceleration AfFB to the target relative deceleration reference value Afn as a target relative deceleration Af (Step S25). Then, the collision avoidance ECU 23 shifts the process thereof to Step S26, which is a next step.

In Step S26, the collision avoidance ECU 23 transmits to the brake ECU 22 information on the target relative deceleration Af determined in Step S15 or in Step S25. Then, the collision avoidance ECU 23 temporarily terminates this process routine.

The brake ECU 22, which has received the information, performs brake control for controlling the brake actuator 13 so that the reference relative deceleration Asub is brought close to the target relative deceleration Af. Also, while performing the brake control, the engine ECU 21 performs limit control to limit the power transmitted from the engine 11 to the wheels 12.

As described above, the present embodiment has the following advantages.

(1) The model deceleration change amount Jmin is set based on speed reduction characteristics of the host vehicle C1 at that time, and the first target value AfR1 is calculated according to a result obtained by multiplying the model deceleration change amount Jmin by the elapsed time ΔTst. A subtraction value obtained by subtracting the current relative deceleration Gr from the first target value AfR1 is less likely to be changed by speed reduction characteristics of the host vehicle C1 at that time. Therefore, even if a control gain used for brake control is set to be a great value, such a request is less likely to be made for greatly changing the deceleration in excess of speed reduction characteristics of the host vehicle C1 at that time. Therefore, it is possible to suppress an excessive load to the brake actuator 13 actuated on actual performance of brake control and perform the brake control appropriately.

(2) Further, the first target value AfR1 increases as the elapsed time ΔTst increases. Therefore, if the target relative deceleration Af is determined based on the first target value AfR1, there is a fear that the target relative deceleration Af may be an excessively great value even after the deceleration Gc of the host vehicle C1 increases to some extent.

Thus, in the present embodiment, when the brake control is started, the second target value AfR2 is calculated by using the above-described relational expression 1. Then, after the model deceleration change amount Jmin has been set, the smaller one of the first and the second target values AfR1, AfR2 is set as a corrected target relative deceleration AfR, and the target relative deceleration Af is determined based on the corrected target relative deceleration AfR. Accordingly, after the deceleration Gc of the host vehicle C1 has increased to some extent, (in FIG. 4, after the fourth time point t24), the target relative deceleration Af is determined based on the second target value AfR2. As a result, it is possible to suppress the target relative deceleration Af from being an excessively great value and perform the brake control appropriately.

(3) Further, in the present embodiment, immediately after the time of meeting the starting condition of brake control, the target relative deceleration reference value Afn is set based on the model profile PM, and the target relative deceleration Af is set as the target relative deceleration reference value Afn. Under the above-described condition, if the brake control is performed and when the reference relative deceleration Asub reaches the specified relative deceleration Ath, the deceleration change amount Jt is calculated, which is the amount of change of the relative deceleration Gr at that time point. The model deceleration change amount Jmin is set according to the deceleration change amount Jt. As described so far, the deceleration change amount Jt is actually measured with the target relative deceleration Af kept at a constant value. Based on thus actually measured value, the model deceleration change amount Jmin is set, thus making it possible to set the model deceleration change amount Jmin to an appropriate value according to speed reduction characteristics of the host vehicle C1 at that time. As a result, it is possible to perform the brake control appropriately.

(4) In a period during which the model deceleration change amount Jmin is not set, in other words, at an initial stage immediately after the start of brake control, the greater the relative speed Vr at the time of meeting the starting condition of brake control, the greater the target relative deceleration Af is determined to be. Thereby, at a time point at which the reference relative deceleration Asub has reached the specified relative deceleration Ath, the amount of change of the deceleration of the host vehicle C1 becomes a value close to a the amount of change of deceleration that is estimated from the speed reduction characteristics of the host vehicle C1 at that time. That is, the deceleration change amount Jt is close to a limit value at that time. Then, since the model deceleration change amount Jmin is set based on the deceleration change amount Jt, it is possible to set the target relative deceleration Af as an appropriate value according to the speed reduction characteristics of the host vehicle C1 at that time. Thereby, in the course of increasing the relative deceleration Gr, the relative deceleration Gr can be suppressed from being increased in an inadvertently slow gradient, thus making it possible to perform the brake control appropriately.

(5) In the present embodiment, when the corrected target relative deceleration AfR is set, the target distance Xth is calculated based on the corrected target relative deceleration AfR. Further, the speed reduction distance is calculated on the assumption that the current deceleration Gc of the host vehicle C1 is retained. When the speed reduction distance is greater than the target distance Xth, the distance feedback deceleration AfFB is set as a positive value. On the other hand, when the speed reduction distance is smaller than the target distance Xth, the distance feedback deceleration AfFB is set as a negative value. Then, the thus obtained distance feedback deceleration AfFB is used to correct the target relative deceleration reference value Afn, setting the corrected value as the target relative deceleration Af. That is, the deceleration of the host vehicle C1 is controlled such that the difference between the speed reduction distance and the target distance comes close to 0 (zero). Therefore, it is possible to bring the interval between the position at which the relative speed Vr reaches the specified speed Vth and the target position P1 close to 0 (zero) as much as possible.

(6) Further, in the present embodiment, the deceleration change amount Jt and the model deceleration change amount Jmin are calculated for each performance of the process routine shown in FIG. 5. Therefore, when the preceding vehicle C2 changes in traveling state during brake control, for example, sudden start of the preceding vehicle C2, the model deceleration change amount Jmin can be changed whenever necessary. The brake control can be performed appropriately by using the target relative deceleration Af determined based on the model deceleration change amount Jmin. That is, even if the preceding vehicle C2 changes in traveling state during the brake control, it is possible to make the relative speed Vr equal to or less than the specified speed Vth at the target position P1.

The above embodiment may be modified to the embodiments described below.

When the reference relative deceleration Asub is less than the specified relative deceleration Ath, a predetermined value set in advance (for example, 0.6 G) may be used as the target relative deceleration Af. When the reference relative deceleration Asub becomes equal to or more than the specified relative deceleration Ath, a value obtained by adding the distance feedback deceleration AfFB calculated in Step S24 to the predetermined value may be set as the target relative deceleration Af. In this case, the predetermined value corresponds to the target relative deceleration reference value.

The model deceleration change amount Jmin does not necessarily need to be in agreement with the deceleration change amount Jt as long as it is a value according to the deceleration change amount Jt. For example, the model deceleration change amount Jmin may be a value obtained by multiplying the deceleration change amount Jt by a gain set in advance (for example, 1.1).

Depending on whether it is easy or difficult to reduce the speed of the host vehicle C1, there is a difference in time point at which the reference relative deceleration Asub becomes greater than or equal to the specified relative deceleration Ath. Therefore, it is acceptable that in place of the deceleration change amount Jt, which is the amount of change in the reference relative deceleration Asub when the reference relative deceleration Asub becomes greater than or equal to the specified relative deceleration Ath, there is obtained a period of time between a time point when the starting condition of brake control has been met and a time point when the reference relative deceleration Asub becomes greater than or equal to the specified relative deceleration Ath. Then, it is also acceptable that when the thus obtained period of time is longer, the model deceleration variation amount Jmin is set to give a greater value than when the period of time is shorter. Even adoption of the above-described control configuration enables to give the model deceleration change amount Jmin as a value according to the deceleration change amount Jt, as with the above-described embodiment.

The model deceleration change amount Jmin may be retained at a value based on the deceleration change amount Jt at the time point at which the reference relative deceleration Asub reaches the specified relative deceleration Ath.

The carried load of the host vehicle C1 can be estimated while no brake control is in operation. When an estimated value of the carried load can be calculated before the start of brake control, the model deceleration change amount Jmin may be calculated based on the estimated value of the carried load at the time of meeting the starting condition of the brake control. In this case, the model deceleration change amount Jmin is set as a smaller value when the estimated value of the carried load is great than when the estimated value of the carried load is small. The corrected target relative deceleration AfR may be calculated based on the model deceleration change amount Jmin immediately after the start of brake control, thereby calculating the distance feedback deceleration AfFB based on the corrected target relative deceleration AfR. Also, the target relative deceleration reference value Afn may be corrected by the distance feedback deceleration AfFB, thereby setting the corrected value as the target relative deceleration Af.

Further, until an estimated time point at which the relative deceleration Gr is increased by performance of the brake control, the target relative deceleration Af may be set as the target relative deceleration reference value Afn. At the estimated time point and thereafter, the target relative deceleration reference value Afn may be corrected by the distance feedback deceleration AfFB, thereby setting the corrected value as the target relative deceleration Af.

The process routine shown in FIG. 5 may be set as a routine that omits the individual processes of Step S22 to S25. In this case, the corrected target relative deceleration AfR set in Step S21 may be set as the target relative deceleration Af.

In Step S22, the corrected target relative deceleration AfR may be integrated once to calculate a target speed. Then, in Step S24, a deceleration requesting value may be calculated so that the vehicle speed VSc of the host vehicle C1 is a target speed, and a value obtained by subtracting the deceleration Gc of the host vehicle C1 at the present time from the deceleration requesting value may be set as a feedback deceleration. Next, in Step S25, the feedback deceleration may be added to the target relative deceleration reference value Afn, thereby giving the thus added result as the target relative deceleration Af.

A subtraction value may be calculated by subtracting the reference relative deceleration Asub from the corrected target relative deceleration AfR, thereby setting the subtraction value as a feedback deceleration. Then, the feedback deceleration may be added to the target relative deceleration reference value Afn, and set the thus added result as the target relative deceleration Af.

In the above-described embodiment, the target relative deceleration Af is set to be a greater value when the distance difference between the target distance Xth and the speed reduction distance is great than when it is small. However, the target relative deceleration Af may be set by a different method. For example, the distance difference is calculated by subtracting the relative distance Xr from the target distance Xth and the target relative deceleration Af is set to be a greater value when the distance difference is great than when the distance difference is small.

The above-described control configuration sets the target relative deceleration Af such that the target distance Xth is in agreement with the relative distance Xr. As a result, it is possible to decrease as much as possible the interval between the position at which the relative speed Vr reaches the specified speed Vth and the target position P1.

The brake control may be performed only when no brake is applied by a driver. Also, the brake control may be performed not only when no brake is applied by the driver, but also when the brake is applied. When the brake control is performed on application of the brake, the brake actuator 13 is controlled such that the relative deceleration Gr comes close to the target relative deceleration Af. That is, the brake actuator 13 is controlled such that the total brake torque composed of the brake torque based on brake application by the driver and the brake torque based on the activation of the brake actuator 13 is a brake torque corresponding to the target relative deceleration Af.

It is acceptable that the speed-reduction control is control including driving control adjusting a driving torque to a wheel, in addition to brake control that adjusts brake torque to the host vehicle C1.

It is acceptable that the collision-avoidance-object recognizing system 15 is not able to measure the relative speed Vr or the relative deceleration Gr as long as it has functions to measure the relative distance Xr. In this case, it is acceptable that the collision avoidance ECU 23 uses a relative distance Xr obtained from the collision-avoidance-object recognizing system 15 to calculate the relative speed Vr and the relative deceleration Gr.

It is acceptable that when the relative speed Vr is made less than or equal to the specified speed Vth to the target position P1 set ahead of the host vehicle C1 in the traveling direction, the speed-reduction control is performed in a case other than avoidance of collision between the host vehicle C1 and a collision avoidance object. For example, when the vehicle passes through a toll gate of a toll road, the target position P1 is set in front of the toll gate and the speed-reduction control is performed such that on passage through the target position P1, the relative speed Vr (in this case, the speed of the vehicle) becomes less than or equal to a specified speed Vth. In this case, the specified speed Vth may be set to be a value greater than or equal to 0 (zero) (for example, 20).

It is acceptable that the travel assist apparatus is used as the brake ECU 22 and the engine ECU 21, for example.

DESCRIPTION OF THE REFERENCE NUMERALS 21, 22, 23: ECU as one example of travel assist apparatus
Af: target relative deceleration
Afn: target relative deceleration reference value
AfR1: first target value
AfR2: second target value
Asub: reference relative deceleration
Ath: specified relative deceleration C1: vehicle
C2: preceding vehicle as one example of object
Gc: deceleration
Gr: relative deceleration
Jmin: model deceleration change amount
Jt: deceleration change amount
P1: target position
Vr: relative speed
Vth: specified speed
Xr: relative distance
Xth: target distance
ΔTst: elapsed time

The invention claimed is:

1. A vehicle travel assist apparatus, adapted to a vehicle control system which performs speed-reduction control in which a relative deceleration of a host vehicle with respect to an object present ahead of the host vehicle in a traveling direction approaches a target relative deceleration, the vehicle travel assist apparatus comprising:
an electronic control unit configured to determine the target relative deceleration such that a relative speed of the host vehicle with reference to the object becomes less than or equal to a specified speed at a target position set behind the object and ahead of the host vehicle, wherein the electronic control unit is configured such that
under a condition that the host vehicle is decelerating due to performing the speed-reduction control by the vehicle control system,
a reference relative deceleration is defined as a value that is obtained by subtracting a relative deceleration of the host vehicle from a current relative deceleration, when a starting condition of the speed-reduction control has been met,
a model deceleration change amount is defined as a value which is indicative of a change amount of the relative deceleration, and also as a value which corresponds to a reference relative deceleration at a time point in which the host vehicle is in constant deceleration gradient,
when the reference relative deceleration reaches a specified relative deceleration, the model deceleration change amount is set to be a smaller value in a state in which it is relatively more difficult to reduce the speed of the vehicle than in a state in which it is relatively easy to reduce the speed of the vehicle,
a subtraction value is obtained by subtracting the current relative deceleration from a target value, which corresponds to a result obtained by multiplying the model deceleration change amount by an elapsed time from a time point at which the reference relative deceleration reaches the specified relative deceleration, and
the target relative deceleration is determined to be a greater value when the subtraction value is great than when the subtraction value is small.

2. The vehicle travel assist apparatus according to claim 1, wherein the electronic control unit is further configured such that
the target value that corresponds to the result obtained by multiplying the model deceleration change amount by the elapsed time is set as a first target value,
based on the current relative speed and a distance between a current position of the vehicle and the target position, a target relative deceleration with which the relative speed becomes equal to or less than the specified speed at the target position is calculated as a second target value,
a subtraction value is obtained by subtracting the current relative deceleration from a smaller target value of the first and the second target values, and
the target relative deceleration is determined to be a greater value when the subtraction value is great than when the subtraction value is small.

3. The vehicle travel assist apparatus according to claim 2, wherein the electronic control unit is further configured such that;
under the condition that the host vehicle is decelerating due to performing the speed-reduction control by the vehicle control system,
when the reference relative deceleration reaches the specified relative deceleration, the model deceleration change amount is set to be a smaller value when a deceleration change amount, which is an amount of change of a reference relative deceleration at the time point, is small than when the deceleration change amount is great.

4. The vehicle travel assist apparatus according to claim 3, wherein the electronic control unit is further configured such that
when the reference relative deceleration is less than the specified relative deceleration, the target relative deceleration is kept at a target relative deceleration reference value, and
in a case in which the reference relative deceleration becomes equal to or more than the specified relative deceleration, the target relative deceleration is determined to be a greater value when a subtraction value obtained by subtracting the current relative deceleration from a smaller target value of the first and the second target values is great than when the subtraction value is small.

5. The vehicle travel assist apparatus according to claim 4, wherein the electronic control unit is further configured such that, when the reference relative deceleration becomes equal to or more than the specified relative deceleration,
with the deceleration of the vehicle maintained at the smaller target value of the first and the second target values, an estimated value of the distance traveled by the vehicle from the present time to a time point at which the relative speed becomes equal to or less than the specified speed is calculated as a target distance, and
with the deceleration of the vehicle maintained at a current deceleration of the vehicle, an estimated value of the distance traveled by the vehicle from the present time to a time point at which the relative speed becomes equal to or less than the specified speed is calculated as a speed reduction distance, and the target relative deceleration is set to be a greater value when a subtraction value obtained by subtracting the target distance from the speed reduction distance is great than when the subtraction value is small.

6. The vehicle travel assist apparatus according to claim 3, wherein the electronic control unit is further configured such that
when the reference relative deceleration is less than the specified relative deceleration, the target relative deceleration is kept at the target relative deceleration reference value, and
when the reference relative deceleration becomes equal to or more than the specified relative deceleration,
with the deceleration of the vehicle maintained at the smaller target value of the first and the second target values, an estimated value of the distance traveled by the vehicle from the present time to a time point at which the relative speed becomes equal to or less than the specified speed as the target distance, and the target relative deceleration is set to be a greater value when a subtraction value obtained by subtracting the distance between the current position of the vehicle and the target position from the target distance is great than when the subtraction value is small.

\* \* \* \* \*